US005125112A

United States Patent [19]

Pace et al.

[11] Patent Number: 5,125,112

[45] Date of Patent: Jun. 23, 1992

[54] TEMPERATURE COMPENSATED CURRENT SOURCE

[75] Inventors: Gary L. Pace, Boca Raton; Brian P. Lenhart, Jr., Boynton Beach, both of Fla.

[73] Assignee: Motorola, Inc., Schaumburg, Ill.

[21] Appl. No.: 583,920

[22] Filed: Sep. 17, 1990

[51] Int. Cl.$^5$ .............................................. H04B 1/16

[52] U.S. Cl. .............................. 455/343; 340/825.44; 331/176

[58] Field of Search ............... 455/117, 127, 343, 228; 331/66, 176; 340/825.44; 307/310, 520; 330/257, 260, 303, 305

[56] References Cited

U.S. PATENT DOCUMENTS

| | | | |
|---|---|---|---|
| 4,598,258 | 7/1986 | Babano | 455/343 |
| 4,843,343 | 6/1989 | Pace | 330/257 |
| 4,870,698 | 9/1989 | Katsuyama et al. | 455/117 |
| 4,939,786 | 7/1990 | McCallum et al. | 455/127 |
| 4,989,260 | 1/1991 | Meade | 455/127 |
| 5,020,138 | 5/1991 | Yasuda et al. | 455/117 |

OTHER PUBLICATIONS

Current Regulators for $I^2L$ Circuits to be Operated from Low-Voltage Power Supplies, IEEE Journal of Solid State Circuts, vol. SC-15, No. 5, Oct., 1980.

*Primary Examiner*—Curtis Kuntz
*Attorney, Agent, or Firm*—Gregg E. Rasor; William E. Koch; Thomas G. Berry

[57] ABSTRACT

A temperature compensated current source (300) is provided that senses a first reference voltage (301) to control a second reference current (302). The current source comprises means (304, 305, 306) for deriving a first reference current (303) in response to the first reference voltage (301) and means (304, 305, 307, 309, 310, 311, 312, 313) for maintaining a desired temperature coefficient of the second reference current (302) by sensing the first reference voltage (301) to control the second reference current (302).

10 Claims, 4 Drawing Sheets

TEMPERATURE COMPENSATED CURRENT SOURCE

FIELD OF THE INVENTION

This invention relates in general to semiconductor current sources and more particularly to a low voltage temperature compensated semiconductor current source.

BACKGROUND OF THE INVENTION

In contemporary integrated circuit systems, a precision current reference is typically required to provide a controllable bias source. For many years, analog and digital circuit systems have used a topology known as a "band-gap" current reference. A band-gap current reference uses the energy band-gap property of a semiconductor device to arrive at a predictable and relatively stable voltage reference from which a reference current can be generated. Operationally, a band-gap voltage reference uses the diode voltage characteristic of a bipolar transistor's base-emitter junction to derive a voltage reference. The base-emitter voltage in a bipolar transistor is given by the following expression:

$$V_{BE} = V_{g0}\left(1 - \frac{T}{T_0}\right) + V_{BE0}\left(\frac{T}{T_0}\right) + \frac{nkT}{q}\ln\left(\frac{T_0}{T}\right) + \frac{kT}{q}\ln\left(\frac{I_C}{I_{C0}}\right)$$

where $V_{BE}$ is dependent on $V_{gO}$, the band-gap voltage; T, the absolute temperature in °Kelvin; $T_O$, the reference temperature in °Kelvin (usually 300 °K); $V_{BEO}$, the reference base-emitter voltage (measured at $T_O$); n, the emission constant; k, the Boltzmann constant; q, the fundamental unit of electronic charge; $I_C$, the bipolar transistor collector current; and $I_{CO}$, the bipolar transistor collector current (measured at $T_O$).

In the case where a first and a second bipolar transistor are operated at different current densities J, the difference in their respective base-emitter voltages is given by the expression:

$$\Delta V_{BE} = \frac{kT}{qln}\left(\frac{J_1}{J_2}\right)$$

with $J_1$ and $J_2$ representing the current densities in each of the respective bipolar transistors. $\Delta V_{BE}$ can be shown to represent a constant differential from $V_{BEO}$, and the sum of these two terms is the band-gap voltage as given by the expression:

$$V_{g0} = V_{BE0} + \frac{kT_0}{q}\ln\left(\frac{J_1}{J_2}\right)$$

This band-gap voltage, particularly the $\Delta V_{BE}$ term, when applied to a pair of base-connected bipolar transistors configured with the first transistor having its emitter connected to ground and the second transistor having its emitter connected to ground via a resistor R (see FIG. 2), results in a current reference with a magnitude of approximately $\Delta V_{BE}/R$ amperes.

The problem with such a conventional band-gap current reference is that the $\Delta V_{BE}$ term is strongly temperature dependent. This along with the temperature dependence of the resistor R, yields a less than desirable situation when extreme accuracy is required over a wide range of temperatures.

Previous attempts to create a current source reference with an adjustable temperature characteristic have resulted in circuits that require a minimum of one resistor to adjust the current reference and at least one other resistor to adjust the temperature coefficient. In these prior art circuits, the alteration of one parameter caused changes in the other, thus resulting in an iterative process for adjustment. In keeping with the present trend of integrated circuit manufacturing, iterative processes for adjustment are not desirable because they increase the cost of the device, decrease reliability, and lower the overall process yield.

SUMMARY OF THE INVENTION

Briefly, according to the invention, there is provided a temperature compensated current source that derives a first reference current in response to a first reference voltage and maintains a desired temperature coefficient of a second reference current by sensing the first reference voltage to control the second reference current.

DESCRIPTION OF A PREFERRED EMBODIMENT

Figure 1:
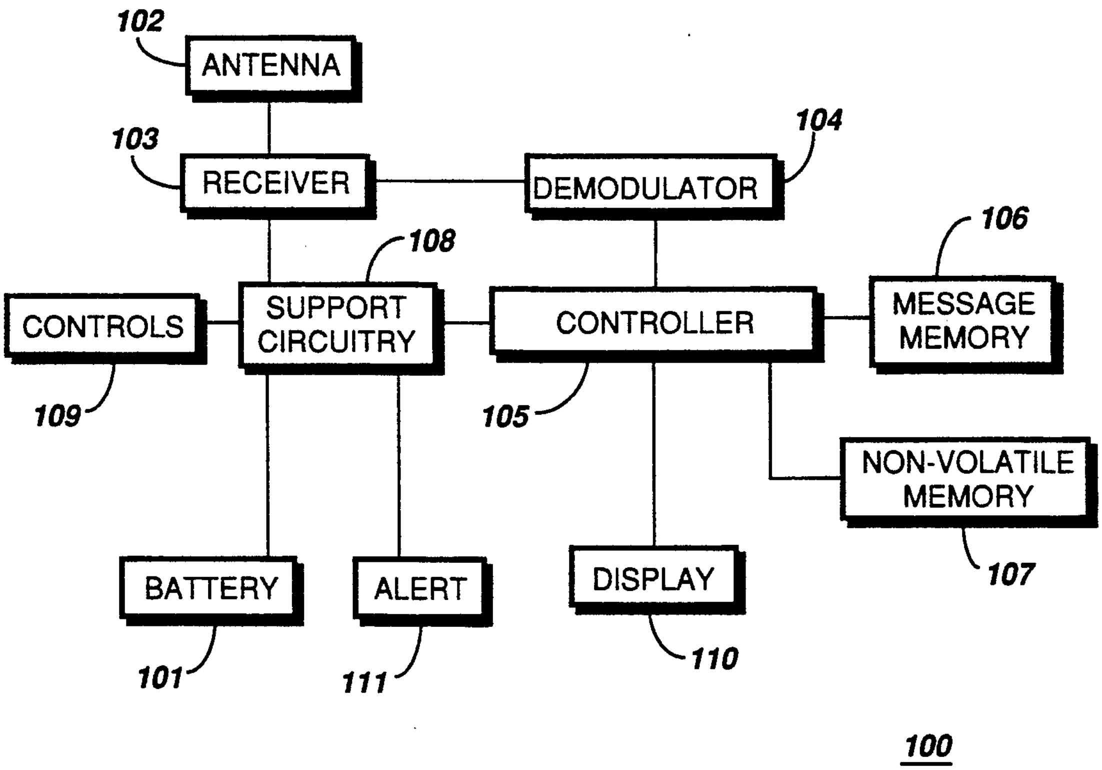
FIG. 1 is a block diagram of a selective call information display receive.

Referring to FIG. 1, a battery 101 powered selective call receiver operates to receive a signal via an antenna 102. A receiver 103 couples a received signal to a demodulator 104, which recovers any information present using conventional techniques. The recovered information is coupled to a controller 105 that interprets and decodes the recovered information. In the preferred embodiment, the controller 105 may comprise a microprocessor having a signal processor (decoder) implemented in both hardware and software.

The recovered information is checked by the decoder, which implements the signal processor that correlates a recovered address with a predetermined address stored in the selective call receiver's 100 non-volatile memory 107. The non-volatile memory 107 typically has a plurality of registers for storing a plurality of configuration words that characterize the operation of the selective call receiver. In determining the selection of the selective call receiver, a correlation is performed between a predetermined address associated with the selective call receiver and a received address. When the addresses correlate, the controller 105 couples message information to the message memory 106. In accordance with the recovered information, and settings associated with the user controls 109, the selective call receiver presents at least a portion of the message information, such as by a display 110, and signals the user via an audible or tactile alert 111 that a message has been received. The user may view the information presented on the display 110 by activating the appropriate controls 109.

The support circuit 108 preferably comprises a conventional signal multiplexing integrated circuit, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide the information display receiver as requested by the customer.

Figure 2:
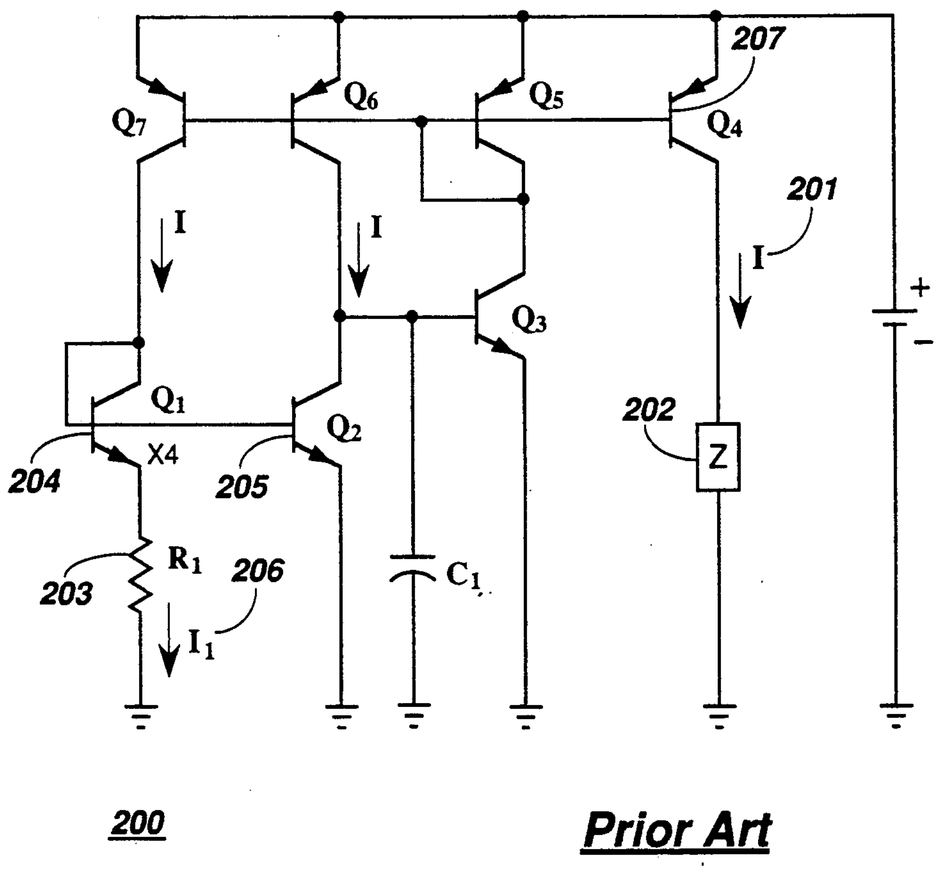
FIG. 2 is a schematic diagram of a prior art band-gap current reference.

Referring to FIG. 2, a prior art band-gap current source reference circuit 200 is typically used on a low-voltage integrated circuit such as the support circuit 108 shown in FIG. 1, to provide bias current to the other circuits (e.g., amplifiers or digital logic) on the integrated circuit. This is a well known circuit with an output bias current I 201 given approximately by:

$$I = \frac{kT\ln(K_1)}{qR_1} \qquad (1)$$

where:

k = Boltzmann constant

T = Temperature in °Kelvin q = Electron charge $K_1 =$ $$\frac{Q_1 \text{ emitter area}}{Q_2 \text{ emitter area}}$$

The output bias current I 201 is directly proportional to temperature T and inversely proportional to resistance $R_1$ 204, where $R_1$ typically has a positive temperature coefficient when fabricated on an integrated circuit. In many applications, particularly those using current-controlled oscillators or current-controlled active filters, the temperature coefficient of the bias current I 201 is critical for optimum operation. For example, the active filter circuits described in U.S. Pat. No. 4,843,343 entitled "Enhanced Q Current Mode Active Filter" and issued to Gary L. Pace and assigned to Motorola, Inc., require a bias current which is directly proportional to temperature in order to provide a filter frequency with a zero temperature coefficient. In this particular example, it is assumed that the associated capacitors have zero temperature coefficients.

The circuit of FIG. 2 cannot provide the required bias current temperature coefficient since this would require that $R_1$ have a zero temperature coefficient and zero temperature coefficient resistors are not available in current integrated circuit fabrication processes. In many cases, the poor manufacturing tolerances on integrated circuit resistors and capacitors will result in $R_1$ having to be trimmed in order to adjust the circuit to a desired reference value.

Operationally, the circuit shown in FIG. 2 generates the output bias current I 201 by generating a first reference current $I_1$ 206 through $R_1$. For large transistor beta (current gain), the first reference current $I_1$ 206 and the emitter currents of transistor 204 ($Q_1$) and transistor 205 ($Q_2$) are approximately equal to I 201. Bipolar transistor 204 has an emitter area that is four times the size of the emitter area of bipolar transistor 205. The difference in areas and equal emitter currents results in a $\Delta V_{BE}$ (base-emitter voltage difference) of approximately 36 millivolts at 300 °K. Because the bases of transistors 204 and 205 are tied together, and the base-emitter voltage of transistor 205 is approximately 36 millivolts higher than the base-emitter voltage of transistor 204, the first reference current $I_1$ 206 generated is equal to the $\Delta V_{BE}$ (which is the voltage across $R_1$) divided by the value of $R_1$. By example, if a 10 μA current reference is desired, R! would be chosen to be 3600 Ω. With $R_1$ set at 3600 Ω, the output bias current I 201 of 10 μA is supplied to the load impedance 202 via a current mirroring transistor 207 ($Q_4$) that repeats the first reference current $I_1$ 206 of 10 μA.

Figure 3:
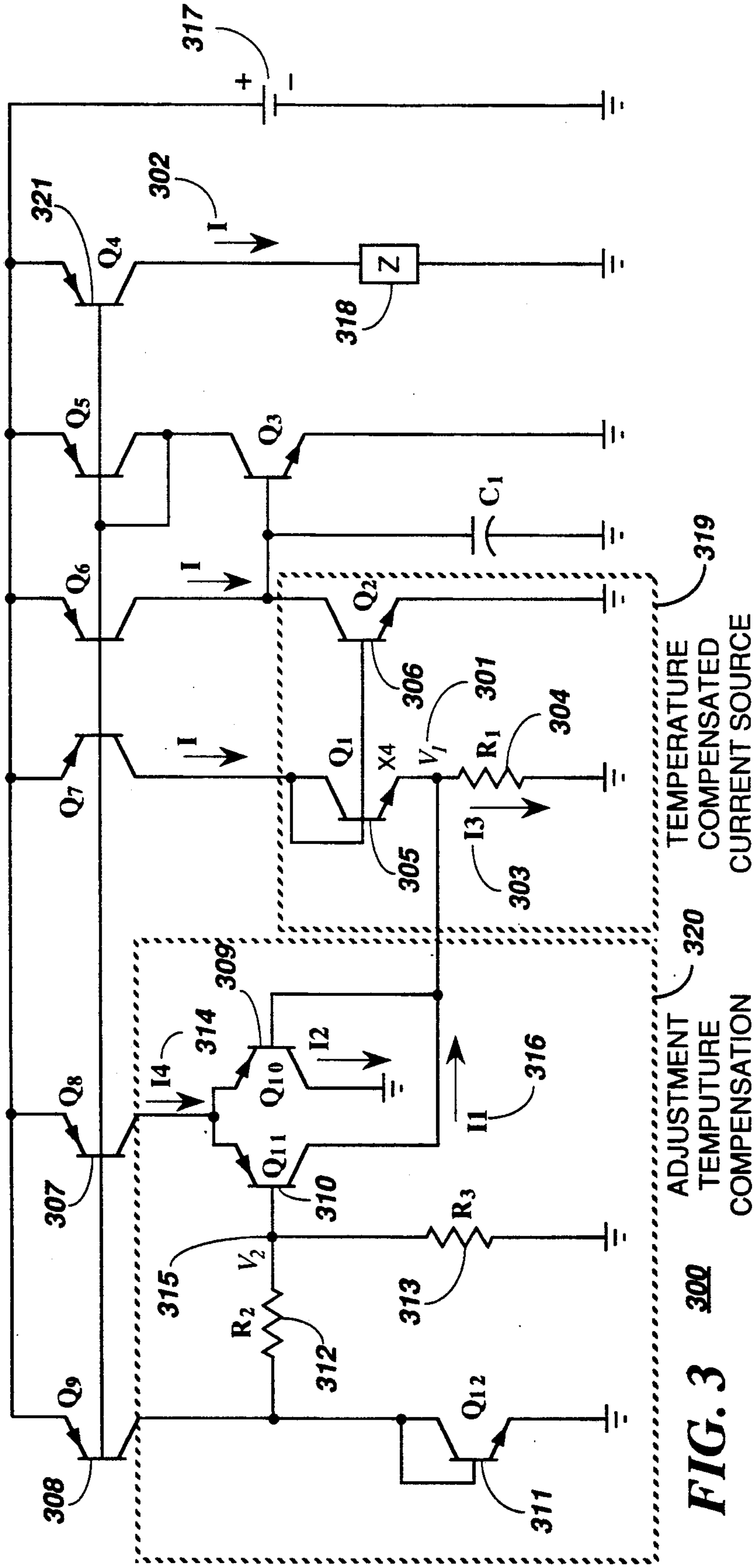
FIG. 3 is a schematic diagram of an improved band-gap current reference having adjustable temperature compensation in accordance with the present invention.

Referring to FIG. 3, the schematic diagram shows an improved band-gap current reference circuit 300 having a temperature compensated current source 319 with adjustable temperature compensation 320 in accordance with the present invention. The current source reference circuit operates by deriving a first reference current $I_3$ 303 in response to a first reference voltage $V_1$ 301 and maintaining a desired temperature coefficient of a second reference current I 302 delivered to a load impedance 318 by sensing the first reference voltage $V_1$ 301 to control the second reference current I 302.

Operationally, a circuit derives the first reference current $I_3$ 303 and preferably generates the second reference current I 302 by mirroring (using transistor 321, $Q_4$) to a load impedance 318 a portion of the first reference current $I_3$ 303 that flows through a first resistor $R_1$ 304. A first bipolar transistor 305 ($Q_1$) has a base, a collector coupled to a first supply voltage 317, and an emitter having a first emitter area that is four times the size of a second emitter area of a second bipolar transistor ($Q_2$) 306 that has a base coupled to the base of the first transistor 305, a collector coupled to the first supply voltage 317, and an emitter. The difference in emitter areas between transistor 305 and transistor 306 and equal emitter currents results in a $\Delta V_{BE}$ (base-emitter voltage difference) of approximately 36 millivolts at 300 °K. As can be seen by one skilled in the art, the ratio of transistor emitter areas and the ratio of emitter currents may vary according to design requirements. The bases of transistor 305 and transistor 306 are coupled together and the base-emitter voltage of transistor 306 is approximately 36 millivolts higher than the base-emitter voltage of transistor 305. The resulting first reference current $I_3$ 303 is generated through $R_1$ which is coupled to a second supply voltage (shown as a ground reference potential in FIG. 3) and the emitter of the first transistor 305. The first reference current $I_3$ 303 is approximately equal to a first reference voltage $V_1$ 301, which is the voltage across $R_1$ 304, divided by the value of $R_1$. The difference in operation as compared to the circuit discussed in reference to FIG. 2, is that the second reference current I 302 is not generated solely by the base-emitter voltage difference between transistor 305 and transistor 306 and the value of $R_1$. Since a portion of the first reference current $I_3$ maintaining a desired temperature coefficient of the second reference current I 302, the resistance $R_1$ required to maintain the second reference current I 302 is smaller. In the case of a 10 μA current reference, the resistor $R_1$ needs to be approximately 2400 Ω. The second reference current I 302 can be adjusted by trimming the single resistor $R_1$ without significantly affecting the temperature coefficient of the second reference current I 302. The reference circuit in FIG. 3 is capable of operating from supply voltages as low as 0.900 volts DC.

The means for maintaining a desired temperature coefficient of a second reference current I 302 comprises PNP transistor 307 ($Q_8$), transistor 308 ($Q_9$), transistor 309 ($Q_{10}$), transistor 310 ($Q_{11}$), NPN transistor 311 ($Q_{12}$), and resistors 312 ($R_2$) and 313 ($R_3$). During operation, a portion, $I_4$ 314, of the output bias current I 302, supplied by PNP transistor 307 and controlled by a differential amplifier comprising transistors 309 and 310, is fed back to the emitter of transistor 305. For large transistor beta:

$$I_3 = I + I_1 \tag{2}$$

The feedback circuit in the band-gap current reference forces the first reference voltage $V_1$ at the emitter of transistor 305 to be approximately:

$$V_1 = \frac{kT\ln(K_1)}{q} \tag{3}$$

and the first reference current $I_3$ 303 flowing through resistor $R_1$ will be given by:

$$I_3 = \frac{kT\ln(K_1)}{qR_1} \tag{4}$$

The differential amplifier has a first input connected to the emitter of transistor 305 which provides the first reference voltage $V_1$ 301 that exhibits a positive temperature coefficient. A second input of the differential amplifier is connected to a voltage biasing network comprising PNP transistor 308, NPN diode-connected transistor 311, resistor 312 and resistor 313. Resistors 312 and 313 are selected to provide a second reference voltage $V_2$ 315 at the second input of the differential amplifier which results in approximately equal collector currents in transistor 309 and transistor 310 at the reference temperature $T_O$. Voltages $V_1$ and $V_2$ are preferably equal when transistor 309 and transistor 310 have substantially equal emitter areas. Resistor 312 and resistor 313 are chosen to be of the same type (e.g., ion implant, epitaxial, etc.) in order to have good resistance tracking over temperature. The total resistance of resistors 312 and 313 should be chosen sufficiently large such that most of the current from the collector of transistor 308 flows through the diode-connected transistor 311. Because the voltages applied to the first and second inputs of the differential amplifier have opposite temperature coefficients, an output current $I_1$ 316 versus an input bias current $I_4$ 314 of the differential amplifier will be a function of temperature as follows:

$$\frac{I_1}{I_4} = \frac{1}{2} + \left[1 - \frac{300}{T}\right]\left[\frac{k\ln(K_1)}{q} + \frac{k\ln(K_3)}{q} - \frac{R_3\alpha_1}{R_2 + R_3}\right]\frac{q}{4k} \tag{5}$$

where:

$\alpha_1$ = temperature coefficient of voltage for diode-connected transistor $Q_{12}$, and $$K_3 = \frac{Q_{11}\text{ emitter area}}{Q_{10}\text{ emitter area}}$$

The input bias current $I_4$314, to the differential amplifier is directly proportional to the second reference current I 302 and is given by:

$$I_4 = (K_2)I \tag{6}$$

where:

$$\frac{Q_8\text{ emitter area}}{Q_7\text{ emitter area}}$$

$K_2$ can be controlled by varying the emitter area of transistor 307 ($Q_8$). Combining equations (2), (4), (5) and (6) and solving for the second reference current I 302 yields:

$$I = \frac{\dfrac{kT\ln(K_1)}{qR_1}}{\left[1 - \dfrac{300}{T}\right]\left[\dfrac{k\ln(K_1)}{q} + \dfrac{k\ln(K_3)}{q} - \dfrac{R_3\alpha_1}{R_2 + R_3}\right]\dfrac{qK_2}{4k} + \dfrac{K_2}{2} + 1} \tag{7}$$

The first term in the denominator of equation (7) results from the temperature compensation circuit current feedback path and provides the capability to adjust the temperature coefficient of the second reference current I 302. By selecting the appropriate values for $K_1$, $K_2$, $K_3$, resistor 312 ($R_2$), and resistor 313 ($R_3$), the temperature coefficient can be adjusted over a wide range. The adjusted temperature coefficient will result in a slightly non-linear current versus temperature characteristic with the amount of nonlinearity depending upon the magnitude of the temperature coefficient adjustment and the temperature excursion allowed. The magnitude of the temperature coefficient can be increased by making the emitter area of transistor 310 larger than the emitter area of transistor 309. The ratio of resistor 312 and resistor 313 would then have to be adjusted so that the collector currents of transistor 309 ($Q_{10}$) and transistor 310 ($Q_{11}$) remain approximately equal at the reference temperature. At 300 °Kelvin, the second reference current I 302 can be derived from equation (7) as:

$$I = \frac{2kT\ln(K_1)}{qR_1(K_2 + 2)} \tag{8}$$

Figure 4:
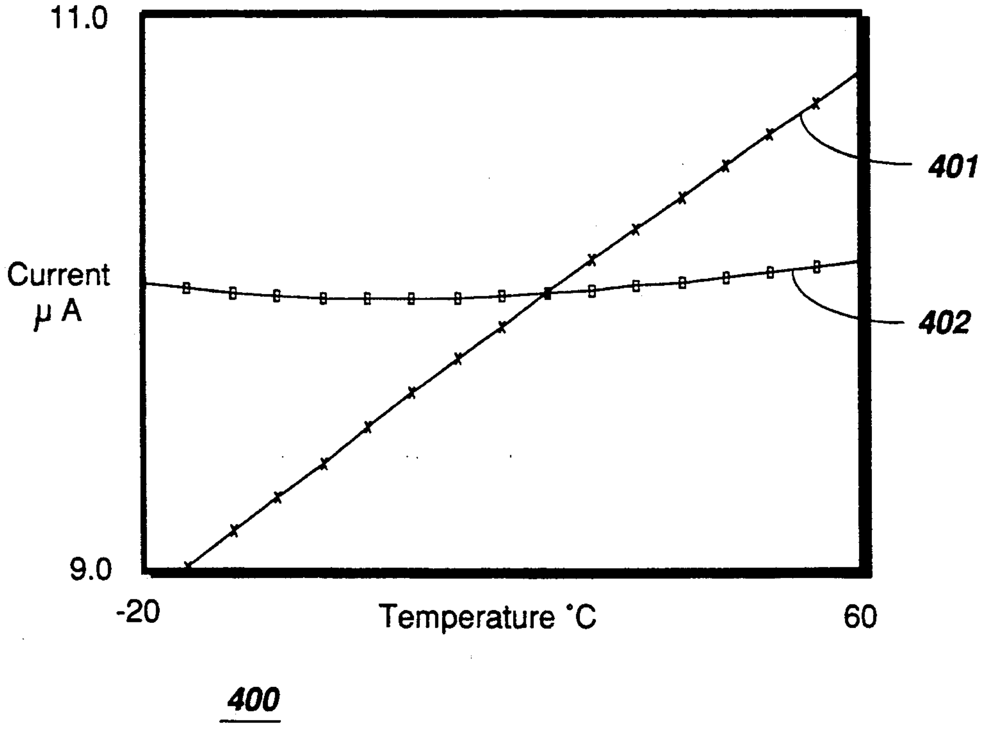
FIG. 4 is an illustration showing the variation in reference current versus temperature for the improved (as shown in FIG. 3) and the prior art (as shown in FIG. 2) bandgap current references.

Referring to FIG. 4, the illustration shows the variation in reference current versus temperature for the improved (as shown in FIG. 3) and the prior art (as shown in FIG. 2) bandgap current references.

The plots were created using equation (1) for the prior art current reference and equation (7) for the improved bandgap current reference.

The variables used in plotting curve 401 using equation (1) are as follows:

$q = 1.602\times10^{-19}$ $k = 1.381\times10^{-23}$ $T_O$ = 298.15 °K

T = °C + 273.15, varied from −20° to +60° °C $TC_1 = 1000 \times 10^{-6}$
where °C is the temperature in degrees Celsius and $TC_1$ is the first order resistor temperature coefficient in parts per million.

Curve 401 is plotted with "X's" at data points and shows the trend with a linearly interpolated solid line. This is the curve for the output bias current I 201 from the circuit shown in the schematic of FIG. 2. The circuit parameters are as follows:

$K_1 = 4$ $R_1 = 3563\ (1 + TC_1\ (T - T_O))\Omega$

Curve 401 shows a variation in the reference current from 8.89 $\mu$A to 10.80 $\mu$A while the temperature varied from −20 to +60° C. This amount of variation is generally not acceptable in a current reference that must regulate a current supply for a device such as a precision analog to digital converter or some current controlled frequency sources. However, the temperature characteristic does not necessarily need to be adjusted to achieve a flat response (as illustrated in FIG. 4, curve 402) over temperature. Other applications may require a specific temperature characteristic slope in either a positive or negative direction which can be achieved using the disclosed invention.

Curve 402 is plotted with "□'s" at data points and shows the trend with a linearly interpolated solid line. This is the curve for the reference current from the circuit shown in the schematic of FIG. 3. The circuit parameters are as follows:

$K_1 = 4$ $K_2 = 1$ $K_3 = 1.5$ $R_1 = 2384.8\ (1 + TC_1(T - T_O))\Omega$ $R_2 = 277\ (1 + TC_1(T - T_O))K\Omega$ $R_3 = 27\ (1 + TC_1(T - T_O))K\Omega$ $\alpha_1 = 2mV/°C$ Note that to maintain equal collector currents in transistor 309 and transistor 310 for the values of resistor 312 and resistor 313 given above, the emitter area of transistor 310 is approximately 1.5 times the emitter area of transistor 309. This assumes that the voltage developed across diode-connected transistor 311 is 0.6 VDC at the reference temperature $T_O$.

Curve 402 shows a maximum variation in the second reference current I 302 from 9.99 $\mu$A to 10.11 $\mu$A while the temperature varied from −20° to +60° C. This amount of variation is greatly reduced from that exhibited by the current reference shown in FIG. 2.

It has been shown that the new current reference circuit in FIG. 3 has the capability to adjust the temperature coefficient of the second reference current I 302 by selecting the appropriate circuit parameters. Once the desired temperature coefficient is selected, the output current can be trimmed, if necessary, by the adjustment of a single resistor (resistor 304) without significantly affecting the temperature coefficient. The temperature coefficient of the second reference current I 302 in FIG. 3 can be adjusted in the opposite direction by reversing the connections to the collectors of transistor 309 and transistor 310.

In another embodiment, the base of transistor 309 is coupled to the second supply voltage (preferably being a ground potential in this case) instead of connecting the base of transistor 309 to the emitter of transistor 305. In this case the emitter area of transistor 310 should be greater than the emitter area of transistor 309 and the second reference voltage $V_2$ should be adjusted to maintain approximately equal collector currents in transistor 309 and transistor 310.

We claim:

1. A selective call receiver capable of receiving a power source for providing power to the selective call receiver system, the selective call receiver comprising:

a receiver for providing a received signal;

a demodulator for recovering the received signal and providing an information signal;

a decoder for correlating a recovered address contained within the information signal with a predetermined address corresponding to the selective call receiver;

a controller for governing the operation of the selective call receiver; and means coupled to the controller for providing an output supply voltage and operational signals thereto for controlling the operation of the selective call receiver and including means for regulating a temperature compensated first reference current for providing the output supply voltage, comprising:

means for deriving an elementary current in response to a first reference voltage; and means for maintaining a desired temperature coefficient of the first reference current by sensing the first reference voltage and a second reference voltage to control the first reference current.

a support circuit coupled to the controller for providing operational signal generation, sensing, and multiplexing for the selective call receiver, comprising:

a current regulator having a control mechanism, the current regulator comprising:

means for deriving a first reference current in response to a first reference voltage; and means for maintaining a desired temperature coefficient of a second reference current by sensing the first reference voltage and a second reference voltage to control the second reference current.

2. The selective call receiver according to claim 1 wherein the means for deriving a an elementary current comprises:

a first transistor having a base and a collector coupled to a first supply voltage, and an emitter having a first emitter area; and a second transistor having a base coupled to the base of the first transistor, an emitter having a second emitter area and coupled to a second supply voltage, and a collector coupled to the first supply voltage.

3. The selective call receiver according to claim 2 wherein the means for deriving an elementary current further comprises:

a first resistor coupled between the emitter of the first transistor and the second supply voltage.

4. The selective call receiver according to claim 1 wherein the means for maintaining a desired temperature coefficient of a second reference current comprises:

a first transistor having a base coupled to the emitter of a second transistor, an emitter coupled to a first supply voltage, and a collector coupled to a second supply voltage;

a third transistor having a base, an emitter coupled to the emitter of the first transistor and to the first supply voltage, and a collector coupled to the emitter of the second transistor; and a fourth transistor having a base and a collector coupled to the first supply voltage, and an emitter coupled to the second supply voltage.

5. The selective call receiver according to claim 4 wherein the means for maintaining a desired temperature coefficient of a second reference current further comprises:

a first resistor coupled between the emitter of the second transistor and the second supply voltage, a second resistor coupled between the base of the third transistor and the base of the fourth transistor; and a third resistor coupled between the base of the third transistor and the second supply voltage.

6. The selective call receiver according to claim 1 wherein the first reference voltage has a negative temperature coefficient.

7. The selective call receiver according to claim 6 wherein the second reference voltage has a positive temperature coefficient.

8. The selective call receiver according to claim 1 wherein the first reference voltage has a positive temperature coefficient.

9. The selective call receiver according to claim 8 wherein the second reference voltage has a negative temperature coefficient.

10. A selective call receiver capable of receiving a power source for providing power to the selective call receiver system, the selective call receiver comprising:

a receiver for providing a received signal;

a demodulator for recovering the receiver signal and providing an information signal;

a controller coupled to the demodulator for correlating a recovered address contained within the information signal with a predetermined address corresponding to the selective call receiver and for governing the operation of the selective call receiver;

an alert device coupler to the controller for providing an alert in response to the received address and the predetermined address correlating; and means coupled within one of the receiver, demodulator and the alert device for regulating a temperature compensated reference current to the receiver, demodulator and the alert device, respectively, comprising:

means for deriving an elementary current in response to a first reference voltage; and means for maintaining a desired temperature coefficient of the reference current by sensing the first reference voltage and a second reference voltage to control the reference current.

* * * * *

UNITED STATES PATENT AND TRADEMARK OFFICE

CERTIFICATE OF CORRECTION

PATENT NO. : 5,125,112

DATED : June 23, 1992

INVENTOR(S) : Pace et al.

It is certified that error appears in the above-identified patent and that said Letters Patent is hereby corrected as shown below:

Column 8, beginning at line 29, please delete the following:

"a support circuit coupled to the controller for providing operational signal generation, sensing, and multiplexing for the selective call receiver, comprising:

a current regulator having a control mechanism, the current regulator comprising:

means for deriving a first reference current in response to a first reference voltage; and means for maintaining a desired temperature coefficient of a second reference current by sensing the first reference voltage and a second reference voltage to control the second reference current.

Column 10, line 5, delete "receiver" and insert --received--.

Column 10, line 12, delete "coupler" and

Signed and Sealed this

Twenty-fourth Day of August, 1993

Attest:

BRUCE LEHMAN

*Attesting Officer* *Commissioner of Patents and Trademarks*